United States Patent [19]
Clement et al.

[11] Patent Number: 4,909,964
[45] Date of Patent: Mar. 20, 1990

[54] NONLINEAR OPTICAL DEVICES FROM DERIVATIVES OF STILBENE AND DIPHENYLACETYLENE

[75] Inventors: Robert A. Clement; Wilson Tam; Ying Wang, all of Wilmington, Del.

[73] Assignee: E. I. DuPont de Nemours and Company, Wilmington, Del.

[21] Appl. No.: 155,023

[22] Filed: Feb. 11, 1988

[51] Int. Cl.$^4$ ............................................. F21V 9/04
[52] U.S. Cl. .................................. 252/589; 350/1.1; 252/582
[58] Field of Search .............................. 252/582, 589

[56] References Cited

U.S. PATENT DOCUMENTS 4,605,869  8/1986  Choe ................................. 307/425
4,792,208 12/1988  Ulman et al. ..................... 350/96.34

FOREIGN PATENT DOCUMENTS 62136601  6/1987  Japan.
62156628  7/1987  Japan.
62160427  7/1987  Japan.
 2204053 11/1988  United Kingdom.

OTHER PUBLICATIONS

Stiegman et al. J.A.C.S. 109, 5884, 1987.
Ulman, A. J. Phys. Chem. 92, 2385, 1988.
March, J. Advanced Organic Chemistry 3rd Ed. Wiley, New York, 1985.
Tweig, R. J.; Jain, K.; Organic materials for Optical Second Harmonic Generation in "Nonlinear Optical Properties of Organic and Polymeric Materials", D. J. Williams, ed. ACS Symp. Ser. 223, ACS, Washington, D.C. 1983, Chapter 3.
Oudar, J. L.; J. Chem. Phys. 67(2) 451, 1977.
Kurihara, T.; Tabei, H.; Kaino, T. J.C.S. Chem. Comm. 959, 1987.
Proceedings SPIE-International Society of Optical Engineering, 971, pp. 107-112 (1988).
Chemical Physics Letters, 148, No. 2,3, pp. 136-141 (1988).
Franken, et al., Physical Review Letters, Vol. 7, 118-119 (1961).
Coda et al., J. Appl. Cryst., Vol. 9, 193 (1976).
Kurihara, et al., J. Chem.; Soc., Chem. Commun., 959-960 (1987).
Fouguey, et al., J. Chem. Soc., Chem. Commun., 1424-1426 (1987).

*Primary Examiner*—Teddy S. Gron
*Assistant Examiner*—Richard Treanor

[57] ABSTRACT

Certain derivatives of stilbene and diphenylacetylene capable of second harmonic generation when illuminated by coherent optical radiation are presented.

11 Claims, No Drawings

NONLINEAR OPTICAL DEVICES FROM DERIVATIVES OF STILBENE AND DIPHENYLACETYLENE

BACKGROUND OF THE INVENTION

1. Field of the Invention

This invention relates to nonlinear optical systems, and particularly to substituted stilbenes and diphenylacetylenes capable of second harmonic generation (SHG) and having other useful nonlinear optical and electro-optic properties.

2. Description of Related Art

The nonlinear optical response of a molecule can be described by the following expansion:

$$\mu = \mu_o + \alpha E + \beta EE + \gamma EEE + \ldots$$

where $\mu$ is the induced dipole moment and $\mu_o$ is the permanent dipole moment of the molecule; $\alpha$, $\beta$, and $\gamma$ are the linear, second order and third order polarizabilities, respectively; E is the applied electric field. To describe an ensemble of molecules such as a crystal, the macroscopic relationship should be used:

$$P = P_o \chi^{(1)} E + \chi^{(2)} EE + \chi^{(3)} EEE + \ldots$$

where P is the induced polarization and $P_o$ is the permanent polarization; $\chi^{(1)}$, $\chi^{(2)}$ and $\chi^{(3)}$ are the linear, second order and third order susceptibility, respectively. Second order nonlinear optical phenomena such as second harmonic generation, sum and difference frequency generation, parametric processes and electro-optical effects all arise from the $\chi^{(2)}$ term. To have a large $\chi^{(2)}$, a molecule should both possess a large $\beta$ and crystallize in a noncentrosymmetric structure. Centrosymmetric crystals have vanishing $\chi^{(2)}$ and are therefore incapable of second harmonic generation.

Franken, et al., Physical Review Letters, Vol. 7, 118-119 (1961), disclose the observation of second harmonic generation upon the projection of a pulsed ruby laser beam through crystalline quartz. They observed the generation of the second harmonic of light, in which light of 6943 Å was converted to light of 3472 Å. The use of a laser remains the only practical way to generate an E large enough to be able to detect the SHG phenomenon.

Coda et al., J. Appl. Cryst., Vol. 9, 193 (1976), disclose SHG in a powder sample of 4-methoxy-4'-nitrostilbene.

Kurihara, et al., J. Chem. Soc., Chem. Commun., 959-960 (1987), disclose the synthesis of 4-methoxy-4'-nitrotolan (MNT) (i.e., 4-methoxy-4'-nitrodiphenylacetylene) and the use of MNT for second harmonic generation.

Fouquey, et al., J. Chem. Soc. Chem. Commun., 1424-6 (1987), disclose the preparation and crystal phase transition temperatures for several 4-amino-4'-nitrostilbene and 4-nitrodiphenylacetylene derivatives. Non-linear optical properties, including second harmonic generation, are noted for selected compounds.

Useful reviews of the art relating to nonlinear properties of organic materials are given in the following references: "Nonlinear Optical Properties of Organic and Polymeric Materials", D. J. Williams, ed., American Chemical Society, Washington, D.C. (1983); D. J. Williams, Angew. Chem., Int. Ed. Engl., Vol. 23, 690 (1984); "Nonlinear Optical Properties of Organic Molecules and Crystals", Vol. 2, D. S. Chemla, et al., ed., Associated Press, Orlando, Fla. (1987).

Although a large number of organic and inorganic materials capable of SHG have been found since Franken's discovery, an intense search continues. Through many years of research, it is now believed that an organic molecule having a conjugated $\pi$ electron system or a low-lying charge transfer excited state often has a large second order polarizability, $\beta$. Many molecules with large $\beta$ have been discovered based on these principles. However, many of these molecules have vanishing $\chi^{(2)}$ because of their unfavorable centrosymmetric crystal structures and therefore have no practical use. To this date, there is no absolute way of predicting whether a molecule can crystallize in a noncentrosymmetric structure.

SUMMARY OF THE INVENTION

The present invention provides a nonlinear optical device capable of second harmonic generation, comprising a nonlinear optical element and a source of coherent optical radiation, said nonlinear element comprising a crystlline compound which is crystallized in a noncentrosymmetric space group, said crystalline compound derived from stilbene or acetylene and selected from the group consisting of

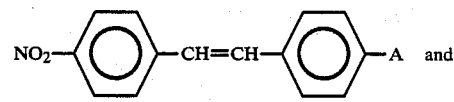 and

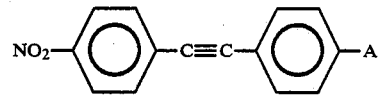

wherein A is selected from Br, Cl, F, I, HCO and OR, where R is selected from H and $C_1$-$C_{10}$ branched or unbranched hydroxyalkyl.

The invention also provides a method of generating second harmonic radiation using the nonlinear optical device. The invention also provides an electro-optic modulator using the nonlinear optical device.

DETAILED DESCRIPTION OF THE INVENTION

It has been found that certain derivatives of stilbene and diphenylacetylene have not only large $\beta$, but also large $\chi^{(2)}$. These compounds have been shown to be capable of second harmonic generation.

Preparations for some of the stilbene and diphenylacetylene derivatives used in the nonlinear optical devices of this invention have been disclosed: trans-4-hydroxy-4'-nitrostilbene by M. Metzler et al., Tetrahedron, Vol. 27, 2225 (1971); trans-4-bromo-4'-nitrostilbene and trans-4-chloro-4'-nitrostilbene by A. Yamaguchi et al., Nippon Kagaku Zasshi, Vol. 91, No. 4, 390-2 (1970); and 4-bromo-4'-nitrodiphenylacetylene by A. Yamaguchi et al., Nippon Kagaku Kaishi, Vol. 11 2103-2107 (1972). Preparations for some of the stilbene and diphenylacetylene derivatives useful in the nonlinear optical devices of this invention are given in the Examples.

It has also been found that the crystal structure of these stilbene and diphenylacetylene derivatives can depend on the method used to obtain the crystals. Thus, as shown in the Table, the SHG efficiency for a given compound will depend on the method used to obtain the crystals. Suitable recrystallation solvents include ethyl acetate, dioxane, tetrahydrofuran, alcohols (e.g., methanol and ethanol), acetone, acetonitrile, chlorinated solvents (e.g., dichloromethane and chloroform), aromatic solvents (e.g., benzene and toluene), hydrocarbons (e.g., hexane) or mixtures of two or more of the above solvents. Noncentrosymmetric crystals may also be obtained from the melt.

The nonlinear optical device of the invention comprises means to direct at least one incident beam of electromagnetic radiation into an optical element having nonlinear optical properties whereby electromagnetic radiation emerging from said element contains at least one frequency different from the frequency of any incident beam of radiation, said different frequency being an even multiple of the frequency of one incident beam of electromagnetic radiation; said optical element comprising a crystalline compound which is crystallized in a noncentrosymmetric space group, said compound being preferably chosen from the group consisting of trans-4-hydroxy-4'-nitrostilbene; trans-4-(3-hydroxypropyloxy)-4'-nitrostilbene; trans-4-(5-hydroxypentyloxy)-4'-nitrostilbene; 4-(6-hydroxyhexyloxy)-4'-nitrostilbene; trans-4-bromo-4'-nitrostilbene; trans-4-chloro-4'-nitrostilbene; trans-4-fluoro-4'-nitrostilbene; trans-4-iodo-4'-nitrostilbene; trans-4-bromo-4'-nitrodiphenylacetylene; and trans-4-formyl-4'-nitrostilbene.

Preferably, the emerging radiation of a different frequency is doubled (second order) (SHG). Preferably, the electromagnetic radiation is radiation from one of a number of common lasers, such as Nd-YAG, Raman-shifted Nd-YAG, semiconductor diode, and Ar or Kr ion.

An optical element in accordance with the present invention is, oriented in one of a potentially infinite number of crystal orientations which achieve partially maximized SHG conversion by virtue of phase matching. The specific orientation is chosen for reasons of noncriticality, maximum nonlinearity, increased angular acceptance, etc. Polarized light of wavelength 1.06 $\mu$ from an Nd-YAG laser is incident on the optical element along the optical path. A lens focuses the light into the optical element. Light emerging from the optical element is collimated by a similar lens and passed through a filter adapted to remove light of wavelength 1.06 $\mu$ while passing light of wavelength 0.53 $\mu$.

The optical element is preferably a single crystal having at least one dimension of about 0.5 mm or greater but can be substantially smaller crystals imbedded in a film of polymer or in glass. The smaller crystals can be randomly oriented or aligned with the same orientation, and are preferably aligned. For the smaller crystals, if their size is small enough to prevent light scattering, they can be dispersed in the polymeric binder and pressed, molded or shaped into an optically clear element capable of SHG. The polymer binder should be chosen to be a non-solvent for the aromatic compound. For larger crystallites, similar elements can be prepared if the binder used has an index of refraction matched to the complex, so as to prevent light scatter yet remain transparent.

It will be further apparent to those skilled in the art that the optical elements of the invention are useful in other devices utilizing their nonlinear properties, such as sum and difference frequency mixing, parametric oscillation and amplification, and devices utilizing the electro-optic effect. The use of crystals having nonlinear optical properties in optical devices is also disclosed in U.S. Pat. Nos. 3,747,022, 3,328,723, 3,262,058 and 3,949,323.

The electro-optic modulator of the invention comprises means to direct a coherent beam into an optical element, and means to apply an electric field to said element in a direction to modify the transmission property of said beam, said optical element meeting the description given above for the optical element for the nonlinear optical device of the invention. The preferred optical elements for the nonlinear optical device and electro-optic modulator of the invention are those embodiments set forth earlier herein for the nonlinear optical element.

An electro-optic modulator embodying the invention utilizes an optical element. A pair of electrodes and is attached to the upper and lower surfaces of the element, across which a modulating electric field is applied from a conventional voltage source. An optical element is placed between two polarizers and A light beam, such as that from a Nd-YAG laser, is polarized by a polarizer, focused on the optical element, propagated through the crystal or crystals and subjected to modulation by the electric field. The modulated light beam is led out through an analyzer polarizer. Linearly polarized light traversing the optical element is rendered elliptically polarized by action of the applied modulating voltage. A polarizer renders the polarization linear again. Application of the modulating voltage alters the birefringence of the optical element and consequently the ellipticity impressed on the beam. The polarizer then passes a greater or lesser fraction of the light beam as more or less of the elliptically polarized light projects onto its nonblocking polarization direction.

It is understood that the invention has been described with reference to preferred embodiments thereof and that variations are to be included within the scope of the invention. Furthermore, frequency or phase modulation of the light beam by the modulator is possible, although the embodiment specifically described performs intensity modulation.

The invention is further illustrated by the following examples. Unless otherwise stated, all reactions were conducted under nitrogen. SHG was measured by the powder method of Kurtz, et al., J. Appl. Phys., Vol. 39, 3798 (1968), using a Nd-YAG laser ($\omega = 1.064$ $\mu$m) and urea as a reference. The polycrystalline urea powder used as a reference had an average particle size of 90 $\mu$m to 125 $\mu$m. The intensity of the second harmonic radiation generated by each sample tested was thus measured relative to that provided by urea.

EXAMPLE 1

Trans-4-Hydroxy-4'-Nitrostilbene

A mixture of 4-nitrophenylacetic acid (1249 g, 6.9 mole), 4-hydroxybenzaldehyde (842 g, 6.9 mole), piperidine (59 g, 0.69 mole) and dimethylacetamide (1 L) was stirred and warmed to 140 °C. in a 5 L round-bottom flask fitted with a mechanical stirrer, a Dean-Stark trap under a condenser, and a thermometer connected to a controller and a heating mantle. There was brisk evolution of $CO_2$ and water, and the latter was removed by the Dean-Stark trap. After 4.5 h at 140° C., evolution of gas and water had ceased, and the mixture was cooled to a solid dark orange mass. This mass was dispersed with methanol (1 L) and water (5 L). Two phases appeared. The upper, aqueous, layer was decanted and the lower, organic layer was stirred with additional water (2 L). Again, the upper layer was decanted and the lower layer stirred with additional water (2 L). The solid which appeared was filtered, washed with methanol (2 L, and then 3×1 L) and dried. An orange solid (294 g, 18%, m.p. 207.7°–208.0° C.) was obtained which had an ir spectrum identical with that of an analytical sample and was suitable for use as an intermediate in further syntheses.

An analytical sample of trans-4-hydroxy-4'-nitrostilbene was prepared as described above and purified by two crystallizations from aqueous ethanol to give bright orange prisms, m.p. 209.8°–210.2° C. The ir and nmr spectra of this sample are consistent with the assigned structure.

Anal. Calcd. for $C_{14}H_{11}NO_3$: C, 69.70; H, 4.56; N, 5.81. Found: C, 69.31, 69.23; H, 4.48, 4.47; N, 6.01, 6.26.

Samples of this compound were prepared for SHG measurements by recrystallization from aqueous ethanol or ethyl acetate. SHG results are presented in the Table.

EXAMPLE 2

Trans-4-(3-Hydroxypropyloxy)-4'-Nitrostilbene

4-Nitrophenylacetic acid (131.4 g, 0.73 mole), 4-(3-hydroxypropyloxy)benzaldehyde (130.8 g, 0.73 mole, prepared as in U.S. Pat. No. 2,824,084), piperidine (14.2 g, 0.17 mole) and dimethylacetamide were placed in a 1 L round-bottom flask fitted with a mechanical stirrer, a condenser and a thermometer connected to a controller and a heating mantle. The resulting mixture was stirred and warmed to 80° C., at which temperature a brisk evolution of gas was induced. Stirring was continued at 80° C. for 18 h. The mixture was then poured into a beaker and stirred and diluted to 3 L with ice and water. The solid that appeared was collected by filtration, washed with water and dried to give a deep yellow product (142 g). Two crystallizations from aqueous ethanol afforded the analytical sample (76.9 g, 35%).

Three different crystalline forms of this material were observed at various times, with melting temperatures of 107° C., 117° C. and 126° C. Above the melting temperature of the modification being observed, the material exhibited a nematic mesophase, with a clearing temperature of 142° C. The ir and nmr spectra are consistent with the assigned structure.

Anal. Calcd. for $C_{17}H_{17}NO_4$: C, 68.22; H, 5.72; N, 4.68. Found: C, 68.30, 68.01; H, 5.67, 5.67; N, 5.03, 4.86.

Samples of this compound were prepared for SHG measurements by recrystallization from aqueous ethanol. SHG results are presented in the Table.

EXAMPLE 3

Trans-4-(5-Hydroxypentyloxy)-4'-Nitrostilbene

5-Bromopentanol (53.4 g, 0.32 mole), 4-hydroxy-4'-nitrostilbene (69.4 g, 0.288 mole), potassium carbonate (83 g, 0.60 mole) and dimethylacetamide (250 mL) were placed in a 500 mL round-bottom flask fitted with a mechanical stirrer, a condenser and a thermometer connected to a controller and a heating mantle. The resulting mixture was heated to 90° C., and maintained at this temperature for 23 h. Thin layer chromatographic analyses (silica gel/dichloromethane) at 7 h and 23 h were identical and showed starting phenol ($R_f$=0.41) in addition to product ($R_f$=0.17). The reaction mixture was transferred to a beaker with the help of methanol (500 mL) and stirred and diluted to 3 L with ice and water. The slurry was cautiously acidified to pH 8 with concentrated hydrochloric acid and filtered. The precipitate was washed with water and dried to give crude product (79.5 g, 84%). This crude product was dissolved in dichloromethane and chromatographed on silica gel (2000 g), starting with dichloromethane as the elutant and ending with 20% ethyl acetate in dichloromethane. Starting phenol (16.5 g) and partially purified product (46.8 g) were obtained. This product was further purified by crystallization from ethanol/water (1000 mL/500 mL) to give orange-yellow flakes (42.2 g, 45%). This material showed a mnematic mesophase, $T_m$ 102.8°–103.2° C., $T_{cl}$ 134.4°–134.5° C.

Anal. Calcd. for $C_{19}H_{21}NO_4$: C, 69.71; H, 6.47; N, 4.28. Found: C, 69.65, 69.62; H, 6.46, 6.41; N, 4.01, 4.15. The ir and nmr spectra are consistent with the assigned structure.

Samples of this compound were prepared for SHG measurements by recrystallization from aqueous ethanol or ethyl acetate. SHG results are presented in the Table.

EXAMPLE 4

4-(6-Hydroxyhexyloxy)-4,'-Nitrostilbene 4-(6-Hydroxyhexyloxy)benzaldehyde [92.6 g, 0.417 mole, Pemawansa, et al., Polymer Preprints, Div. of Polymer Chem., A.C.S., Vol. 26(1), 262 (1958)], 4-nitrophenylacetic acid, (77.8 g, 0.417 mole), piperidine (3.55 g, 0.042 mole) and dimethylacetamide (100 mL) were placed in a 500 mL round bottom flask fitted with a mechanical stirrer, a Dean-Stark trap under a condenser and a thermometer connected to a controller and a heating mantle. The mixture was stirred and heated to 135° C., at which temperature there was a brisk evolution of $CO_2$ and water. The temperature of the reaction mixture was maintained at 135° C. for 1.5 h, when the evolution of gases had ceased. The mixture was then cooled and poured into water (2.5 L). The gummy yellow solid which separated was taken up in dichloromethane (6 L) and washed twice with water (1 L). Evaporation of the solvent using a rotary evaporator left crude product as an oily yellow solid. This material was triturated with methanol (500 mL), filtered and dried to give a pale yellow solid (33.9 g, 24%). A slurry of this solid in ethanol (3 L) was heated to boiling, cooled and the solid recovered by filtration. Crystallization of this material from 1-propanol gave the analytical sample as a yellow solid (28.2 g, 20%), m.p. 159.2°–159.4° C.

Anal. Calcd. for $C_{20}H_{23}NO_4$: C, 70.36; H, 6.70; N, 4.10. Found: C, 69.90, 70.32; H, 6.67, 6.81; N, 4.38, 4.10. The ir and nmr spectra are consistent with the assigned structure.

Samples of this compound were prepared for SHG measurements by recrytallization from 1-propanol or ethyl acetate. SHG results are presented in the Table.

EXAMPLE 5

Trans-4-Bromo-4'-Nitrostilbene

Dimethylphosphite (5.0 g) in glyme (20 mL) was added to a slurry of 50% sodium hydride dispersion in oil (2.09 g) in glyme (100 mL) and the mixture stirred for 0.5 h. 4-Bromobenzyl bromide (10.75 g) in glyme (70 mL) was added dropwise and the mixture stirred overnight (approx. 16 h). 4-Nitrobenzaldehyde (6.52 g) was added. Initially, a purple solution was formed, but after several hours the flask contained an off-white slurry.

Sodium methoxide (2.33 g) was added in small portions, forming a purple solution which became warm. The slurry was stirred in a drybox for 3 h, at which point tlc (silica gel with 10% ethyl acetate/hexane) showed no nitrobenzaldehyde. The brown solution was poured onto ice and stirred. The crude product was isolated by filtration and dried in a vacuum. The isolated solid was purified by dissolving it in dichloromethane, filtering the solution and then precipitating the product with hexane. The yellow crystals which were obtained were washed with hexane and vacuum-dried to give a first crop of crystals (2.01 g). Concentration of the filtrate provided a second crop of crystals.

Samples of this compound were prepared for SHG measurements by recrystallization from ethyl acetate, acetone, toluene or dichloromethane. SHG results for this compound are presented in the Table.

EXAMPLE 6

Trans-4-Chloro-4'-Nitrostilbene

The procedure described in Example 9 was repeated using 4-chloro-benzylchloride (7.0 g) in place of the analogous benzylbromide. The crude product was vacuum-dried, washed with pentane and dissolved in dichloromethane. This solution was dried over $Na_2SO_4$ and then stripped of solvent. Pentane was added to the residue, and the resulting solid was filtered, washed with pentane and vacuum-dried to give a yellow-orange solid (7.130 g).

Samples of this compound were prepared for SHG measurements by recrystallization from toluene, ethyl acetate, methanol and acetone. SHG results for this compound are presented in the Table.

EXAMPLE 7

4-Fluoro-4'-Nitrostilbene

A solution of diethyl p-nitrobenzylphosphonate (2.73 g) in ethanol (10 mL) was added to a solution of sodium (0.245 g) in ethanol (20 mL). The resulting mixture was stirred for 5 min, and then a solution of 4-fluorobenzaldehyde (1.24 g) in ethanol (10 mL) was added. The reaction mixture was stirred for 1 h. a yellow precipitate (1.444 g) was isolated.

Samples of this compound where prepared for SHG measurements by recrystallization from toluene, or used without recrystallization. SHG results for this compound are presented in the Table.

EXAMPLE 8

4-Bromo-4'-Nitrodiphenylacetylene

Sodium hydride (0.130 g, 50% in oil) was added to a solution of 1-bromo-1-(4-nitrophenyl)-2-(bromophenyl)ethylene (1.00 g) in dimethyl formamide (20 mL) and the resulting solution was stirred for 2 h. A saturated ammonium chloride solution (30 mL) was added to the reaction mixture. The precipitated product was filtered, washed with water, ethanol and vacuum-dried to give an off-white solid (0.759 g).

Samples of this compound were prepared for SHG measurements by recrystallization from chloroform/pentane, toluene and ethyl acetate. SHG results for this compound are presented in the Table.

EXAMPLE 9

Trans-4-Formyl-4'-Nitrostilbene

Sodium ethoxide in ethanol (0.23 g Na in 10 mL ethanol) was added to a solution containing diethyl p-nitrobenzyl-phosphonate (2.73 g, 0.01 mole), 4-bromobenzaldehyde (1.85 g, 0.01 mole) and ethanol (50 mL) at 0° C. The mixture was warmed to room temperature and stirred overnight. The product was filtered, washed with ethanol and vacuum-dried overnight to give trans-4-formyl-4'-nitrostilbene (2.826 g, 0.0093 mole, 93%, m.p. 251°–219° C.).

Anal. Calc. for $C_{15}H_{11}NO_3$: C, 71.14; H, 4.38. Found: C, 71.18; H, 4.40. 2H nmr in $CD_2Cl_2$: 10.00 (s, 1H); 8.22 (d, J=8.5 Hz, 2H); 7.7 (d, J=8.5 Hz, 2H); 7.7 (d, J=6.5 Hz, 2H); 3.77 (d, J=6.5 Hz, 2H); 2.733 (s, 2H). Ir (KBr): 1693 m, 1598 m, 1589 sh, 1565 m, 1337 s.

A sample of this compound was prepared for SHG measurements by recrystallization from dichloromethane/pentane. SHG results for this compound are presented in the Table.

EXAMPLE 10

4-Iodo-4'-Nitrostilbene

To a solution containing 2.73 g (0.01 mole) of diethyl p-nitrobenzylphosphonate and 2.5 g (0.01 mole) 4-iodobenzaldehyde in 50 ml of ethanol at 0° C. was added sodium ethoxide in ethanol (prepared from 0.23 g (0.01 mole) of Na in 10 ml ethanol). The mixture was warmed to room temperature and then stirred overnight. The mixture was filtered and washed with ethanol. The solid was vacuum dried o give 3.294 g (0.0094 mole, 94%) of the product.

Samples of this compound were prepared for SHG measurements by recrystallization from ethanol, toluene, ethyl acetate, chloroform, dimethyl sulfoxide, or used without recrystallization. SHG results for this compound are presented in the Table.

TABLE

SHG DATA FOR COMPOUNDS USED IN EXAMPLES 1–10

| Example | SHG, relative to urea | Crystal Growing Medium |
| --- | --- | --- |
| 1 | 0.55 | Aqueous ethanol |
|  | 1 | Ethyl acetate |
| 2 | 0.18–0.25 | Aqueous ethanol |
| 3 | 0.16 | Aqueous ethanol |
|  | 0 | Ethyl acetate |
| 4 | 3.8 | 1-Propanol |
|  | 1.4 | Ethyl acetate |
| 5 | 31–44 | Hot ethyl acetate |
|  | 33 | Hot acetone |
|  | 177 | Hot toluene |
|  | 73 | Dichloromethane, 0° C. |
| 6 | 4.4 | Toluene |
|  | 11 | Ethyl acetate |
|  | 3.5 | Methanol |
|  | 2.8 | Acetone |
| 7 | 4.5 | (Not recrystallized) |
|  | 7.7 | Toluene |
| 8 | 114 | Chloroform/pentane |
|  | 57 | Toluene |
|  | 79 | Ethyl acetate |
| 9 | 28 | Dichloromethane/pentane |
| 10 | 117 | (Not recrystallized) |
|  | 72 | Ethanol |
|  | 86 | Toluene |
|  | 50 | Ethyl acetate |
|  | 117 | Chloroform |
|  | 67 | Dimethyl |

TABLE-continued

SHG DATA FOR COMPOUNDS USED IN EXAMPLES 1-10

| Example | SHG, relative to urea | Crystal Growing Medium |
|---------|----------------------|------------------------|
|         |                      | sulfoxide              |

What is claimed is:

1. A nonlinear optical device capable of second harmonic generation comprising a nonlinear optical element, a source of coherent optical radiation, and means to direct the radiation emerging from said source into the element, said nonlinear optical element comprising a crystalline compound selected from the group consisting of

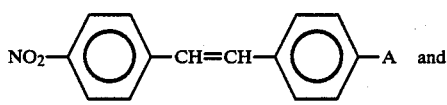

and

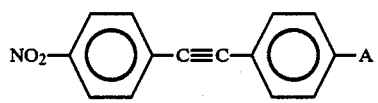

wherein A is selected from Br, Cl, F, I, HCO, and OR, where R is a $C_1$-$C_{10}$ branched or unbranched hydroxyalkyl; said compound being crystallized in a noncentrosymmetric space group.

2. An optical element as defined in claim 1 where R in the compound of said element, wherein A is OR, is selected from hydroxypropyl, hydroxypentyl and hydroxyhexyl.

3. An optical element as defined in claim 1 wherein the compound is trans-4-(3-hydroxypropyloxy)-4'-nitrostilbene.

4. An optical element as defined in claim 1 wherein the compound is trans-4-(5-hydroxypentyloxy)-4'-nitrostilbene.

5. An optical element as defined in claim 1 wherein the compound is 4-(6-hydroxyhexyloxy)-4'-nitrostilbene.

6. An optical element as defined in claim 1 wherein the compound is trans-4-bromo-4'-nitrostilbene.

7. An optical element as defined in claim 1 wherein the compound is trans-4-chloro-4'-nitrostilbene.

8. An optical element as defined in claim 1 wherein the compound is trans-4-fluoro-4'-nitrostilbene.

9. An optical element as defined in claim 1 wherein the compound is trans-4-formyl-4'-nitrostilbene.

10. An optical element as defined in claim 1 wherein the compound is 4-iodo-4'-nitrostilbene.

11. An optical element as defined in claim 1 wherein the compound is 4-bromo-4'-nitrodiphenylacetylene.

* * * * *